(12) United States Patent
English et al.

(10) Patent No.: US 8,759,511 B2
(45) Date of Patent: Jun. 24, 2014

(54) THERMALLY INHIBITED POLYSACCHARIDES AND PROCESS OF PREPARING

(75) Inventors: Thomas J. English, Parkesburg, PA (US); Kamlesh Shah, Monmouth Junction, NJ (US); James J. Kasica, Whitehouse Station, NJ (US); Christopher C. Lane, Princeton, NJ (US); Tushar Shah, Jersey City, NJ (US)

(73) Assignee: Corn Products Development, Inc., Jabaquara, Sao Paulo (BR)

( * ) Notice: Subject to any disclaimer, the term of this patent is extended or adjusted under 35 U.S.C. 154(b) by 0 days.

(21) Appl. No.: 13/570,557

(22) Filed: Aug. 9, 2012

(65) Prior Publication Data
US 2013/0203983 A1    Aug. 8, 2013

Related U.S. Application Data

(62) Division of application No. 12/423,213, filed on Apr. 14, 2009, now Pat. No. 8,268,989.

(60) Provisional application No. 61/051,057, filed on May 7, 2008.

(51) Int. Cl.
*C07H 1/00* (2006.01)
*C07H 3/00* (2006.01)
*C08B 37/00* (2006.01)

(52) U.S. Cl.
USPC .......................................................... 536/124

(58) Field of Classification Search
None
See application file for complete search history.

(56) References Cited

U.S. PATENT DOCUMENTS 5,830,884 A * 11/1998 Kasica et al. ................. 514/160

OTHER PUBLICATIONS

Shimelis et al. Physio-chemical Properties, Pasting Behavior and Functional Characteristics of Flours and Starches from Improved Bean (*Phaseolus vulgaris* L.) Varieties Grown in East Africa, paper from International Commission of Agricultural Engineering, E-Journal vol. 8 (2006).*

* cited by examiner

*Primary Examiner* — Layla Bland
(74) *Attorney, Agent, or Firm* — Karen G. Kaiser

(57) ABSTRACT

This invention is directed to a process for making a thermally inhibited polysaccharide by dehydrating a polysaccharide to substantially anhydrous or anhydrous conditions and thermally inhibiting the substantially anhydrous or anhydrous polysaccharide at a temperature of 100° C. or greater for a time sufficient to inhibit the polysaccharide in an oxygen enriched concentration of at least 6.5 moles/m$^3$.

4 Claims, 5 Drawing Sheets

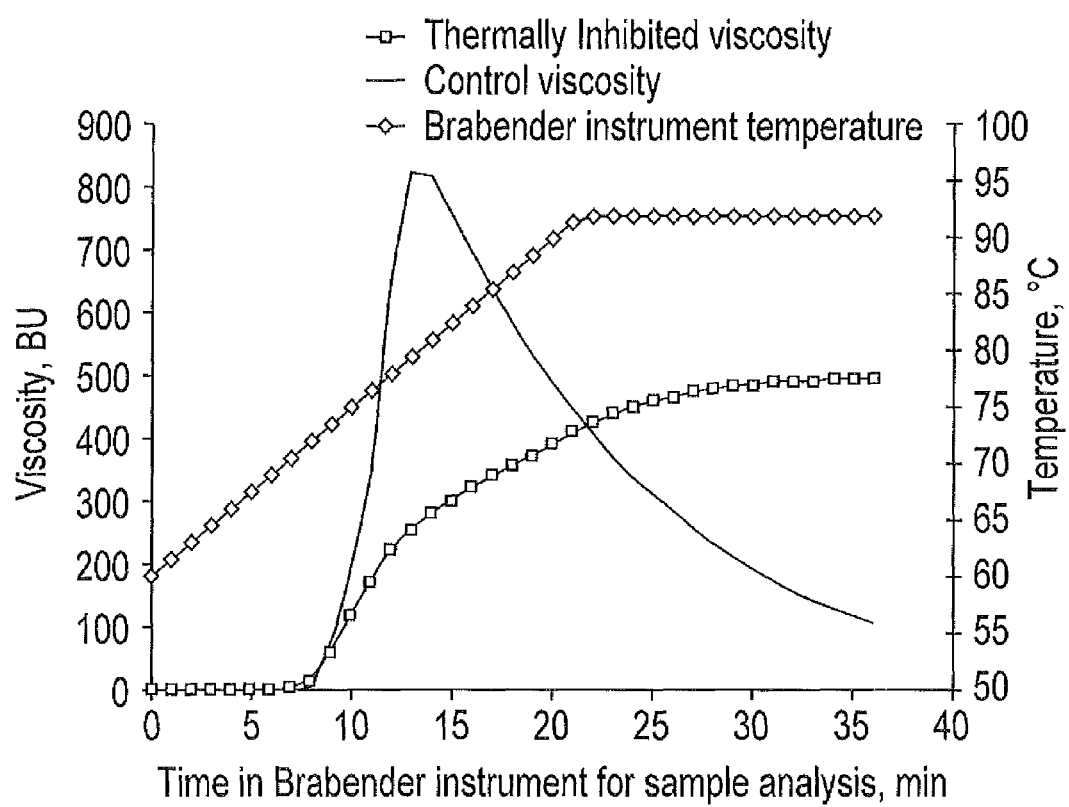
Figure 1. Example Brabender viscosity curve used to determine inhibition.

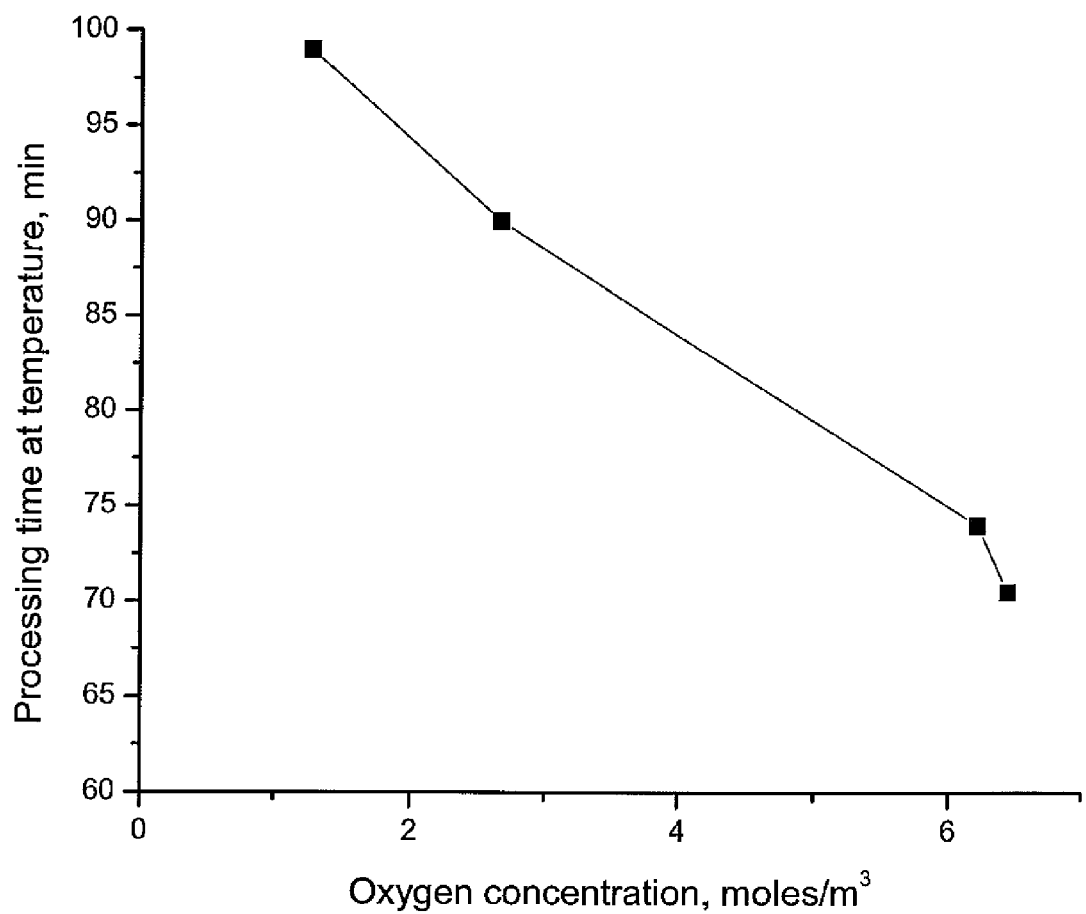
Figure 2. Processing time at 165.5°C as a function of vessel headspace oxygen concentration.

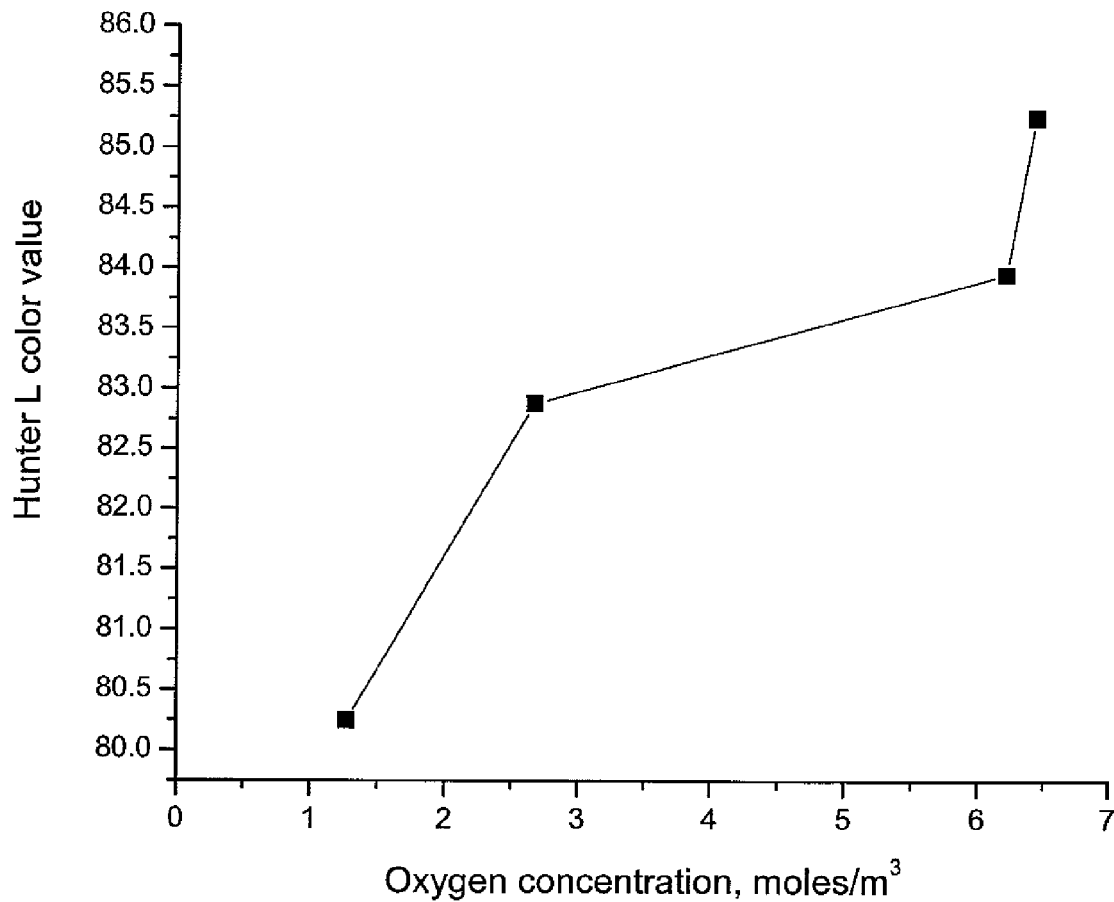
Figure 3. Hunter L color value for material with a 400BU 92°C viscosity in a pH 3 buffered Brabender cook.

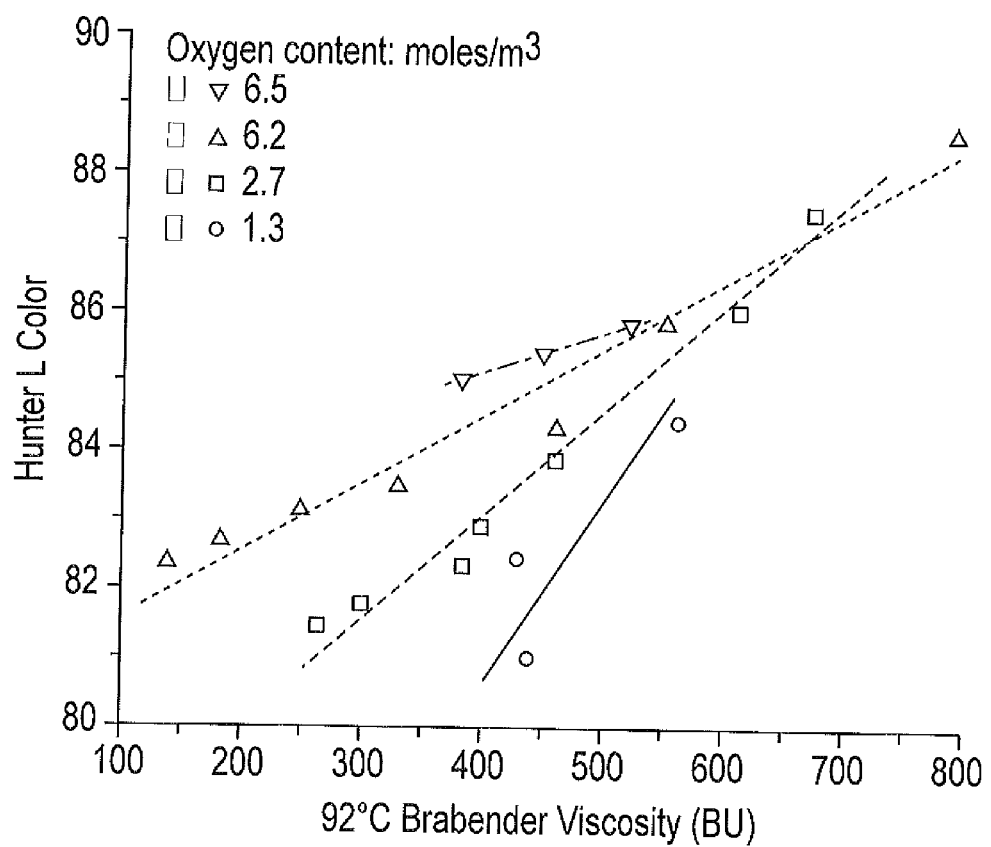
Figure 4. Hunter L color versus Brabender viscosity for experiments in Example 1.

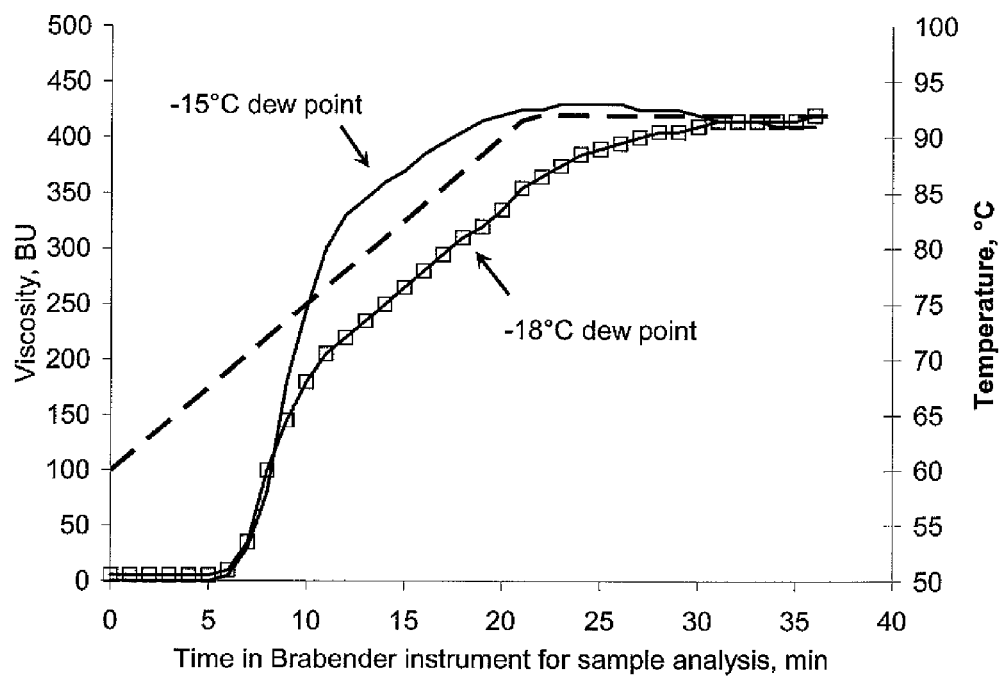
Figure 5. Brabender viscosity profile for starches thermally inhibited with varied fluidization gas moisture contents.

THERMALLY INHIBITED POLYSACCHARIDES AND PROCESS OF PREPARING

This application claims priority to provisional application U.S. Ser. No. 61/051,057 filed 7 May 2008.

BACKGROUND OF THE INVENTION

This invention relates to thermally inhibited polysaccharides and improved processes of preparing them under effective oxygen concentrations of at least 6.5 moles/m$^3$ to produce compositions of improved organoleptic properties, including color, flavor and odor.

It is well known that starch can be heated for various purposes such as drying, vaporizing off-flavors, imparting a smoky taste, dextrinizing or annealing. More recently, heat treatment has been used to make thermally inhibited starches. U.S. Pat. No. 5,725,676 issued Mar. 10, 1998 to Chiu et al, discloses a process for making thermally inhibited, non-pregelatinized granular starch using heat treatment. U.S. Pat. No. 6,261,376 issued Jul. 17, 2001 to Jeffcoat et al., discloses a thermally inhibited, pregelatinized, non-granular starch or flour prepared by dehydrating and heat treating the starch or flour.

SUMMARY OF THE INVENTION

Now it has been found that significantly improved organoleptic properties, such as color, and rate of inhibition result from the process of thermally inhibiting polysaccharides by use of an effective oxygen concentration during thermal inhibition treatment of the polysaccharide. In one aspect of this invention, the oxygen content of the vessel atmosphere is increased without increasing the Limiting Oxygen Concentration (12% (v/v) oxygen), thus providing a possible design option for safe operation.

It has also been found that decreasing the dew point temperature of the processing gas during thermal inhibition substantially reduces hydrolysis during the thermal inhibition reaction.

This invention is directed to a process for making a thermally inhibited polysaccharide which comprises the steps of:

a) dehydrating the polysaccharide to substantially anhydrous or anhydrous conditions; and b) thermally inhibiting the substantially anhydrous or anhydrous polysaccharide in an effective oxygen concentration of at least 6.5 moles/m$^3$ though the use of increased vessel pressure and/or increased oxygen content to a temperature of 100° C. or greater for a time sufficient to inhibit the polysaccharide.

BRIEF DESCRIPTION OF DRAWINGS

FIG. 1 shows a Brabender curve for a waxy cornstarch example used to determine inhibition. A control curve illustrates the viscosity profile for a native starch not thermally inhibited using the same Brabender procedure.

FIG. 2 shows processing time required to reach a 400 BU viscosity at 92° C. with different oxygen concentrations during inhibition.

FIG. 3 illustrates Hunter L color values for material with a 400 BU viscosity at 92° C. and different oxygen concentrations during inhibition.

FIG. 4 depicts the change in Hunter L color during inhibition as measured by the Brabender viscosity for experiments in Example 1.

FIG. 5 depicts the impact of gas moisture content during inhibition on Brabender viscosity profiles.

DETAILED DESCRIPTION OF THE INVENTION

Polysaccharides suitable for use in this invention, and as the term is used herein, include starches, ingredients containing starches, materials derived from starches, gums and materials derived from gums and blends thereof.

Ingredients containing starches include without limitation, flours and grits. Materials derived from starches include without limitation oligosaccharides and other starch derived materials including those prepared by physically, enzymatically or chemically modifying the starch. Such materials are known in the art and may be found in standard texts such as *Modified Starches: Properties and Uses*, Ed. Wurzburg, CRC Press, Inc., Florida (1986).

The starch used in this invention may be any starch derived from any native source. A native starch as used herein, is one as it is found in nature. Also suitable are starches derived from a plant obtained by standard breeding techniques including crossbreeding, translocation, inversion, transformation, insertion, irradiation, chemical or other induced mutation, or any other method of gene or chromosome engineering to include variations thereof. In addition, starch derived from a plant grown from induced mutations and variations of the above generic composition which may be produced by known standard methods of mutation breeding are also suitable herein.

Typical sources for the starches are cereals, tubers and roots, legumes and fruits. The native source can be any variety, including without limitation, corn, potato, sweet potato, barley, wheat, rice, sago, amaranth, tapioca (cassava), arrowroot, canna, pea, banana, oat, rye, triticale, and sorghum, as well as low amylose (waxy) and high amylose varieties thereof. Low amylose or waxy varieties is intended to mean a starch containing less than 10% amylose by weight, in one embodiment less than 5%, in another embodiment less than 2% and in yet another embodiment less than 1% amylose by weight of the starch. High amylose varieties is intended to mean a starch which contains at least about 30% amylase, in a second embodiment at least about 50% amylose, in a third embodiment at least about 70% amylose, in a fourth embodiment at least about 80% amylose, and in a fifth embodiment at least about 90% amylose, all by weight of the starch.

The polysaccharide may be physically treated by any method known in the art to mechanically alter the polysaccharide, such as by shearing or by changing the granular or crystalline nature of the polysaccharide, and as used herein is intended to include conversion and pregelatinization. Methods of physical treatment known in the art include ball-milling, homogenization, high shear blending, high shear cooking such as jet cooking or in a homogenizer, drum drying, spray-drying, spray cooking, chilsonation, roll-milling and extrusion.

The polysaccharide may be chemically modified by treatment with any reagent or combination of reagents known in the art. Chemical modifications are intended to include crosslinking, acetylation, organic esterification, organic etherification, hydroxyalkylation (including hydroxypropylation and hydroxyethylation), phosphorylation, inorganic esterification, ionic (cationic, anionic, nonionic, and zwitterionic) modification, succination and substituted succination of polysaccharides. Also included are oxidation and bleaching. Such modifications are known in the art, for example in *Modified starches: Properties and Uses*. Ed. Wurzburg, CRC Press, Inc., Florida (1986).

The starch may be granular or pregelatinized, either before or after the thermal inhibition. Pregelatinized starches, also known as cold water soluble or dispersed starches, are well known in the art as are the methods of preparing them by thermal, chemical or mechanical gelatinization and then drying. The term "gelatinized" starch refers to swollen starch granules which have lost their polarization (Maltese) crosses or have had them weakened and which may, or may not, have lost their granular structure. The thermal processes used to gelatinize such starches include batch cooking, autoclaving, and continuous cooking processes, in equipment which includes, without limitation, in a heat exchanger, jet-cooker, spray drier, and drum drier.

Gums that may be used are well known in the art and include xanthan, carrageenan, gellan, locust bean, alginate, pectin, agar, gum arabic, and guar gum. Materials derived from gums include those listed which have been further modified using methods known in the art such as hydrolysis and chemical modification.

Starch and flour are particularly useful polysaccharides. In one suitable embodiment, the starch base is a native starch, in another embodiment is a native waxy starch, and in yet another embodiment is a native high amylose starch.

The polysaccharide may be a single polysaccharide or a blend of two or more polysaccharides. The polysaccharides also may be thermally inhibited in the presence of other materials or ingredients which would not interfere with the thermal inhibition process nor substantially hydrolyze the polysaccharide.

The thermal inhibition process may be carried out prior to or after the polysaccharide is further modified. In one embodiment, the modification is conducted before the polysaccharide is thermally inhibited. In another embodiment, the polysaccharide is not further modified, before or after thermal inhibition.

The polysaccharide may first be adjusted, if necessary, to a pH level effective to maintain the pH at neutral (range of pH values around 7, from about pH of 6 to 8) or basic pH (alkali) during the subsequent thermal inhibition step. Providing a polysaccharide at a pH of neutral, or above, before the thermal inhibition step is believed to reduce or eliminate the potential for any hydrolysis of the polysaccharide that may occur during this step. Therefore, particularly if the dehydration step is thermal, adjustment of the pH may be done before the dehydration step. If the dehydration temperature is not at high temperatures (above about 100° C.), pH adjustment may be done after the dehydration step, or both before and after.

The pH, in one embodiment, is adjusted to 6.0-12.0, and in another 7.0-10.0. While a higher pH may be used, such a pH will tend to increase browning of the polysaccharide during the thermal inhibition treatment and may cause other adverse reactions such as gelatinization. Therefore, pH adjustments to a pH no greater than 12 are typically most effective. It should be noted that the noncohesive textural and viscosity benefits of the thermal inhibition process tend to be enhanced as the pH is increased. In selecting the precise pH at which the polysaccharide will be thermally inhibited, the practitioner will select a balance between color formation and functional characteristics.

In one aspect of the invention in which the polysaccharide is starch, the pH is adjusted to 7.5-12.0, in another to 8.0-10.5 and in yet another 9.0-10.0. In another aspect of the invention in which the polysaccharide is flour, the pH is adjusted to 6.0-9.5, and in yet another from 7.0-9.5.

Adjustment of the pH may be accomplished by any method known in the art. In one embodiment in which the polysaccharide is in insoluble form which does not significantly swell, the pH is adjusted by slurrying the polysaccharide in water (e.g. 1.5 to 2 parts water to 1 part polysaccharide) or in an aqueous medium and raising the pH by the addition of any suitable base. After the pH of the polysaccharide has been brought into the desired pH range, the slurry may be dewatered and then dried, or dried directly, typically to a moisture content of from 2% (wt/wt) to the equilibrium moisture content of the polysaccharide. It is known in the art that the equilibrium moisture content is dependent upon, inter alia, the type of polysaccharide as well as its source (e.g. potato, corn). This drying procedure is to be distinguished from the dehydration step in which the polysaccharide is dehydrated to anhydrous or substantially anhydrous conditions. In another embodiment, the pH is adjusted by spraying a solution of a base (alkali) onto the polysaccharide. Buffers, such as sodium carbonates or phosphates, may be used to maintain pH, if needed.

For food applications, a food grade base is used. Suitable food grade bases for use in the pH adjustment step of the process include, but are not limited to, salts of carbonates, hydroxides, and phosphates, including orthophosphates, together with any other base approved for food use under regulatory laws. Bases not approved for food use under these regulations may also be used, provided they can be washed from the polysaccharide so that the final product conforms to good manufacturing practices for food use. In one aspect of this invention, the food grade base is sodium carbonate.

If the polysaccharide is not going to be used for a food use, the base need not be a food grade base, and any workable or suitable inorganic or organic base that can raise the pH may be used. In one aspect of the invention, whether a food grade or non-food grade base is used, a base is chosen which is capable of maintaining the desired pH throughout the thermal inhibition process.

The polysaccharide is dehydrated to anhydrous or substantially anhydrous conditions. As used herein, the term "substantially anhydrous" is intended to mean less than 2%, in one embodiment less than 1.5% and in yet another embodiment less than 1% (w/w) water. The dehydration may be accomplished by any means known in the art and includes thermal methods, and non-thermal methods such as using a hydrophilic solvent such as an alcohol (e.g. ethanol), freeze drying, vacuum drying, or using a desiccant. Non-thermal dehydration improves the taste of the thermally-inhibited polysaccharides.

The dehydration step to remove moisture and obtain a substantially anhydrous polysaccharide may be carried out by a thermal dehydration procedure using a heating device for a time and temperature sufficient to reduce the moisture content to that desired. In one embodiment, the temperature used is 125° C. or less. In another embodiment, the temperature will range from 100 to 140° C. While the dehydration temperature can be lower than 100° C., a temperature of at least 100° C. will be more effective in removing moisture when using a thermal method.

The dehydration step may be conducted using any process or combination of processes which allows moisture to be removed and in one embodiment is conducted in a thin film of less than one inch, and in another less than half an inch. Typical procedures where starch is dehydrated are disclosed in U.S. Pat. No. 5,932,017 issued to Chiu et al on Aug. 3, 1999 and U.S. Pat. No. 6,261,376 issued to Jeffcoat et al on Jul. 17, 2001.

In an embodiment of this invention, dehydration of the polysaccharide is carried out using a vacuum and, optionally in combination with a gas purge, while heating at an elevated temperature. In another embodiment, the elevated temperature is from 82 to 166° C. The technique of using vacuum with the option of a gas purge for dehydration, can be used in any equipment that can heat material with a controlled temperature profile under at least a partial vacuum, and in one embodiment in equipment that can heat material with a controlled temperature profile under a vacuum while supplying a purge gas. The vessel or container used as equipment must be rated for vacuum, i.e. sufficiently sealed to maintain a vacuum and structurally sound to prevent vessel collapse. The purge gas may be any inert gas including without limitation carbon dioxide or nitrogen and in one embodiment is nitrogen. In one embodiment, the purge option is used if the vacuum is insufficient to remove water vapor present in the system. In another embodiment, starch is vacuum dried to anhydrous or substantially anhydrous conditions in a fluidized bed reactor.

In another embodiment, the polysaccharide is dehydrated in a pressurized reactor under elevated temperatures and pressure. In one embodiment, the elevated temperature is from 82° C. to 166° C. while the pressure is from atmospheric to 525 kPag, while in another embodiment the pressure is from 145 to 515 kPag. In yet in another embodiment the vessel atmosphere is kept below the Limiting Oxygen Concentration by use of a mixed nitrogen/oxygen gas stream and in yet a further embodiment, the oxygen is in the range of 8-12% by volume of the surrounding gas. The technique of using increased pressure can be used in any equipment that can heat material with a controlled temperature profile. The vessel or container used as equipment must be rated for pressure, i.e. structurally sound to contain the vessel pressure when operating in oxygen atmospheres below the Limiting Oxygen Concentration, and in one embodiment able to contain or safely vent the propagation of a combustion-deflagration wave caused by a dust explosion at elevated temperature/pressures if the vessel atmosphere exceeds the Limiting Oxygen Concentration when using higher oxygen concentrations.

As used herein, a fluidized (bed) reactor, fluidized (bed) drier or fluidized (bed) mixer is intended to mean any apparatus in which the polysaccharide is substantially fluidized, whether by gas, mechanical or other means.

The thermal inhibition step is performed by heating the substantially anhydrous polysaccharide in an oxygen enriched concentration at a temperature of 100° C. or greater for a time sufficient to inhibit the polysaccharide.

When polysaccharides are subjected to heat in the presence of water, hydrolysis or degradation may occur. Hydrolysis or degradation will reduce the viscosity, change the texture typically by increasing cohesiveness, and results in increased color development. Therefore, the conditions for the dehydration need to be chosen so that inhibition is favored while reducing hydrolysis and degradation. In one aspect of the invention, the polysaccharide is substantially anhydrous before reaching heat treatment temperatures, and in another aspect of the invention the polysaccharide is substantially anhydrous throughout at least ninety percent of the heat treatment.

In one aspect of this invention, an important aspect of the thermal inhibition procedure is to maintain the oxygen concentration, i.e. moles oxygen/m$^3$ at a certain level. In one embodiment, increasing effective oxygen concentration to at least 6.5 moles/m$^3$ results in increased inhibition rates and a surprisingly reduced rate of color development resulting in improved organoleptic qualities, including color, taste, and odor. In another embodiment, the effective oxygen concentration is increased to at least 9 moles/m$^3$, in another to at least 12 moles/m$^3$, and in yet another to at least 25 moles/m$^3$. Increased oxygen concentration may be used over a wide range, with equipment effectiveness and safety considerations being limiting factors. Increased oxygen concentration may be achieved by any method known in the art. In one embodiment, increased oxygen concentration is achieved by using enriched oxygen gas (greater than the about 21% (v/v) oxygen content of air). This embodiment may be at ambient pressure or at higher pressure, as long as safety is maintained, and in one embodiment is at ambient pressure. In another embodiment, increased oxygen concentration is achieved by increasing the pressure of the gas above ambient within the apparatus during thermal inhibition, this embodiment has the advantage that the Limiting Oxygen Concentration (below which combustion of cornstarch is prevented) does not change with the pressure of the gas. In another embodiment, the combination of increased oxygen, either above the Limiting Oxygen Content and/or enriched oxygen content and pressure will provide the greatest improvement in reducing the thermal inhibition time and decreasing the color (increasing the Hunter L-value) of the product. In yet another embodiment of the invention, the polysaccharide is dehydrated using vacuum drying and then thermally inhibited under increased oxygen concentration. In still yet another embodiment of the invention, the polysaccharide is dehydrated using increased pressure and or increased effective oxygen concentration and then thermally inhibited under increased oxygen concentration.

Along with purge gas oxygen concentration, gas moisture content also impacts thermal inhibition. In one embodiment the polysaccharide is, thermally inhibited with purge gases dried to less than a dew point of −15° C., and in another embodiment less than −20° C. By keeping the gas moisture content low, polysaccharide degradation is substantially prevented during thermal inhibition. In yet another aspect of the invention, the polysaccharide is thermally inhibited with purge gases dried to less than a dew point of −15° C. and in an oxygen concentration of at least 6.5 moles/m$^3$.

In another embodiment of thermal inhibition, the flow rate of the purge gas is maintained at a minimum. This flow rate is dependent upon the gas used and the pressure maintained as well as the type of equipment used. This minimum flow rate decreases as the pressure of the reaction is increased and/or with the additional of mechanical agitation.

The thermal inhibition will be conducted over a range of temperatures of at least 100° C. In one embodiment, the temperature will range from 100 to 200° C., in another embodiment from 120 to 180° C. and in yet another embodiment from 150 to 170° C.

The time for thermal inhibition in one embodiment is from 0 to 12 hours, in another embodiment is from 0.25 to 6 hours and in yet another embodiment is from 0.5 to 2 hours. The time for thermal inhibition is measured from the time the temperature stabilizes (the target temperature is reached) and therefore the thermal inhibition time may be zero if thermal inhibition occurs while such temperature is being reached. For example, if conducting the process in an apparatus which has a comparatively slow temperature ramp-up, once the polysaccharide has reached substantially anhydrous conditions, thermal inhibition will begin if the temperature is sufficiently high and may be complete before the apparatus reaches final temperature.

The dehydrating and/or thermal inhibition steps may be performed at normal pressures, under vacuum or under pressure, and may be accomplished using any means known in the art. In one method, the gas used is pre-dried to remove any moisture.

The dehydration and thermal inhibition steps may be accomplished in the same apparatus or different apparatus. In one embodiment, the dehydrating and thermal inhibition steps are in the same apparatus and in another embodiment are continuous (not batch). The dehydration and inhibition steps may be carried out in any apparatus (singular or plural). When the dehydration and thermal inhibition steps are carried out in an apparatus which is very efficient at removing moisture, the two steps may occur substantially simultaneously. The two steps may also occur simultaneously during ramp up of temperature.

The dehydration step is typically conducted in an apparatus fitted with a means for moisture removal (e.g. a vent, vacuum or a blower to sweep gas from the head-space of the apparatus, fluidizing gas) to substantially prevent moisture from accumulating and/or precipitating onto the polysaccharide; however, the thermal inhibition step may be conducted in an apparatus with or without such means for moisture removal. In one embodiment, the thermal inhibition apparatus is equipped with a means for removing water vapor from the apparatus. The dehydrating and thermal inhibition apparatus (singular or plural) can be any thermally controlled vessel and includes without limitation industrial ovens, such as conventional or microwave ovens, dextrinizers, fluidized bed reactors and driers, and mixers or blenders.

The time and temperature combination for the dehydration and thermal inhibition steps will depend upon the equipment used and may also be affected by the type of polysaccharide being treated, the pH and moisture content, and other factors identified and selected by the practitioner.

By varying the process conditions, including the initial pH, the dehydrating method and conditions, and the thermal inhibition temperatures, times and conditions, the level of inhibition can be varied to provide different viscosity characteristics in the final thermally inhibited polysaccharide.

Following the thermal inhibition step, the polysaccharide may be further processed by one or more of the following: screened to select a desirable particle size, slurried and washed, filtered and/or dried, bleached or otherwise refined, and/or pH adjusted. The polysaccharide may further be blended with other unmodified or modified polysaccharide or with food ingredients before use in an end use product.

The resultant polysaccharides are functionally similar to chemically crosslinked polysaccharides in that they may have a non-cohesive, smooth texture when cooked out (e.g., to maximize its functionality or performance in a selected application) or dispersed (e.g. for starch, no longer exhibits birefringence or Maltese crosses), and/or excellent tolerance to processing variables such as heat, shear and extremes of pH, particularly for a significant time under such conditions. Also, for non-pregelatinized starches, the Brabender viscosity initializes (starts to build) at an earlier or substantially the same time as the same starch which has not been thermally inhibited. Such thermally inhibited polysaccharides may also provide a desirable smooth texture to the processed food product and maintain their capacity for thickening throughout processing operations. In addition, the thermally inhibited polysaccharides will have less viscosity breakdown than the same polysaccharide which has not been thermally inhibited.

Viscosity breakdown, as used in this invention, is intended to mean for a granular starch 1) for a thermally inhibited starch with a peak, that the Brabender viscosity of the thermally inhibited polysaccharide decreases with a less steep slope than the Brabender viscosity of the same polysaccharide which is not thermally inhibited; or 2) for a thermally inhibited polysaccharide without a peak, that the Brabender viscosity profile of the thermally inhibited polysaccharide obtains a maximum viscosity during early stages of the hold phase and then remains substantially flat throughout the hold cycle of the Brabender viscosity curve; or 3) for a thermally inhibited polysaccharide without a viscosity peak which has been more inhibited than (2), that the Brabender viscosity of the thermally inhibited polysaccharide obtains a significant fraction of its viscosity in the early stages of the hold phase but continues to gradually increase in viscosity throughout the remainder of the hold phase; or 4) for a thermally inhibited polysaccharide without a viscosity peak which has been more inhibited than (3), that the Brabender viscosity of the thermally inhibited polysaccharide increases gradually during the heating cycle and into the early stages of the hold phase before a more rapid increase in viscosity during the remaining stages of the hold phase. Brabender viscosity analysis of a pre-gelatinized starch is very different from that of a granular starch. Since it is pre-gelatinized, it is dispersed and hydrated independent of the Brabender method and does not necessarily require heating. Depending on the method selected by the skilled practitioner, one generally observes less breakdown for the thermally inhibited pre-gelatinized starch in the later stages of the method as compared to the non-thermally inhibited pre-gelatinized control.

The Brabender viscosity profiles discussed above serve as a proxy for non-cohesive, short textured products that are suitable for a wide range of applications. One skilled in the art understands that the degree of inhibition is matched to the application target to give the desired properties.

The resultant thermally inhibited polysaccharides have improved color, flavor and odor. In one embodiment, the Hunter color of the thermally inhibited polysaccharide decreases by less than 7, and in another embodiment by less than 5 Hunter L units compared to the polysaccharide before thermal inhibition, using the method described in the examples section. In one embodiment, the Hunter L color is at least 0.5 units, in another at least 1 unit, in yet another at least 2 units, and in still yet another at least 3 units, higher than a polysaccharide which is processed in the same fashion at an effective oxygen concentration of less than 6.5 moles/m$^3$.

The resultant thermally inhibited polysaccharide may be used in place of chemically modified or crosslinked polysaccharides presently used in foods, yet maintain a clean label (non-modified label). Among the food products that may be improved by the use of the polysaccharides of this invention are baby foods, liquid infant formulations, sauces and gravies, soups, salad dressings and mayonnaise and other condiments, yoghurt, sour cream and other dairy products, pudding and pie fillings, fruit preparations, liquid diet products and liquid products for hospital feeding, baked goods such as bread, cakes, and cookies, and ready-to-eat cereals. The polysaccharides are also useful in dry mixes for sauces, puddings, baby foods, hot cereals, nutritional products, and the like. The thermally inhibited polysaccharides are suitable for use in food applications where viscosity stability is required through all processing temperatures. The resultant polysaccharide may be used in any amount desired and is typically used at substantially the same concentration as a chemically modified polysaccharide which imparts similar viscosity and textural attributes. In one embodiment, the polysaccharide is used in an amount of 0.1 to 35% and in another of 2 to 6%, by weight of the food product.

The thermally inhibited polysaccharides may also be used in place of chemically modified or crosslinked polysaccharides presently used in other applications in which such polysaccharides are currently used, including without limitation in the manufacture of paper, pharmaceuticals, packaging, adhesives and personal care products.

EXAMPLES

The following examples are presented to further illustrate and explain the present invention and should not be taken as limiting in any regard. All parts and percentages are given by weight, except for the percent oxygen or other gas which is given by volume, and all temperatures in degrees Celsius (° C.) unless otherwise noted.

The following procedures were used throughout the examples.

Brabender Viscosity Procedure

The polysaccharide to be tested was slurried in a sufficient amount of distilled water to give 5% anhydrous solids slurry at pH 3—adjusted with a sodium citrate/citric acid buffer. Charge weight is 23.0 grams anhydrous polysaccharide, 387 grams distilled water, and 50 grams buffer solution. Buffer solution is prepared by mixing 1.5 volumes of 210.2 grams citric acid monohydrated diluted to 1000 ml with distilled water with 1.0 volumes of 98.0 grams tri-sodium citrate, dihydrate diluted to 1000 ml with distilled water. The slurry was then introduced to the sample cup of a Brabender VISCO\Amylo\GRAPH (manufactured by C. W. Brabender Instruments, Inc., Hackensak, N.J.) fitted with a 350 cm/gram cartridge and the viscosity was measured as the slurry was heated (at a rate of 1.5° C./minute) to 92° C. and held for fifteen minutes (15'). The viscosity was recorded at 92° C. and again after the fifteen minute hold at 92° C. (92° C.+15). Time relative to the Brabender procedure is zeroed when the charge is brought to 60° C.

The VISCO\Amylo\GRAPH records the torque required to balance the viscosity that develops when a polysaccharide slurry is subjected to a programmed heating cycle.

Using this procedure, substantial hydrolysis for waxy maize corn starch may be indicated by a 92° C.+15 minute viscosity less than the 92° C. viscosity with a 92° C. viscosity less than 500 BU. One skilled in the art realizes that it is difficult to separate hydrolysis from thermal inhibition by viscosity alone. For example, either high levels of thermal inhibition or high levels of hydrolysis may result in low viscosity. It is known that a more thorough analysis is required to measure the extent of hydrolysis either through texture, where hydrolysis will produce longer and more cohesive textures, or through a measurement of the granular starch solubility where an increase in solubility after dispersion or cooking is indicative of hydrolysis.

Moisture Procedure

Five grams of powder is weighed onto a Cenco B-3 Digital moisture balance. The bulb power is set to 100% to heat the sample to between 135-140° C. for 15 minutes. Weight percent moisture is determined by weight loss and reported directly by the moisture balance.

Hunter Colorimeter Procedure

The Hunter Color Quest II is warmed up for an hour prior to performing standardization or analyzing samples. Standardization is performed using the procedure provided by the manufacturer. Sample readings are taken using the following settings: Scale=Hunter Lab, Illuminant=D65, Procedure=NONE, Observer=10*, MI Illuminant=Fcw, Difference=DE, Indices=YID1925 (2/C), Display Mode=Absolute, Orientation=Row Major. All color analysis reported here is performed on powder samples. Powder is loaded into the sample cell and the cell is tapped to eliminate gaps between the cell window and the powder. The sample cell is loaded into the colorimeter and the sample read.

Example 1

Effect of Oxygen Concentration in a Mechanically Fluidized Mixer

A series of experiments was conducted using the same lot of anhydrous (<1% moisture by vacuum drying) waxy corn starch, that has been pH adjusted with a combination of hydroxide and carbonate to a pH of 9.5, in a ProcessAll pilot scale mechanically fluidized mixer. A 45.5 kg batch size was used throughout the experimental series.

The anhydrous starch product was heated to 166° C. over a two hour period. Once the starch reached the temperature, samples were pulled every 30 minutes for analysis. In each experiment, the oxygen concentration in the vessel headspace was controlled at varying levels. Processing time was determined by the time at temperature necessary to produce a 92° C. viscosity of 400 Brabender Units (BU) in a buffered pH Brabender cook.

FIG. 1 is an example Brabender curve used to determine inhibition for the starch sample and it shows the point and time when the starch sample reaches a 92° C. viscosity of 400 BU.

FIG. 2 shows the processing time required to reach a 400 BU 92° C. viscosity for different samples thermally inhibited in varied oxygen concentrations. It is shown that the processing time required to reach a 400 BU 92° C. viscosity decreases with increasing oxygen concentration.

Color values were determined for the powdered starch material that had a 400 BU 92° C. viscosity in a 3 pH buffered Brabender cook with the starch samples being thermally inhibited at different oxygen concentrations. Hunter L color values were determined for the different powder samples and shown in FIG. 3. As shown, the samples processed at higher oxygen concentrations have a whiter color value, i.e. higher Hunter L color value, at the reduced time to reach a 92° C. viscosity of 400 BU. More importantly, color is formed at a reduced rate—i.e. the rate of color formation for increased inhibition (lowering of the 92° C. viscosity) is reduced as the oxygen content is increased as shown in FIG. 4. It has also been shown that as the color formation of the inhibited product is reduced i.e. higher final Hunter L values at the same level of inhibition, and the products have a correspondingly better organoleptic profiles.

Example 2

Effect of Oxygen Concentration in a Fluidized Bed Reactor

Waxy starch adjusted to a pH of 9.5 (Hunter L color=94.87) is dehydrated and then thermally inhibited in a pressurized fluid bed reactor under varying oxygen concentration levels—all below the Limiting Oxygen Concentration. In the first experiment, the starch is dehydrated at 132° C. and at 345 kPag. When the moisture is less than 1%, the contents are heated to 166° C. When the temperature reaches 166° C. (time t=0), a sample is taken for analysis. Time, t=0, is the onset of inhibition or the thermal treatment phase for starches. Sampling of the starches and subsequent analysis continues while the starch is held at 166° C. as described in Example 1

In a second experiment, the pH adjusted waxy starch is dehydrated, at 132° C. and 517 kPag to less than 1% moisture in a fluid bed reactor, while in a third experiment, the pH adjusted waxy starch is dehydrated at 132° C. and ambient pressure, to less than 1% moisture in a fluid bed reactor. In experiments 1 and 2 the pressure during dehydration is maintained as the starch is heated to 166° C. and held for the duration of the inhibition. All other parameters for experiments 2 and 3 are the same as described above for experiment 1.

The oxygen content (moles/m$^3$), color at T=0, the processing time to reach a 92° C. viscosity of 400 BU and the associated Hunter L color are shown in Table 1. These results show that dehydrating starch in a pressurized system retards the development of color. As in experiment 1, the increased oxygen content results in a reduced process time to reach a 92° C. viscosity of 400 BU and lower color at this process time/viscosity.

TABLE 1

| Pressure (kPag) | Oxygen Concentration [moles/m³] | Hunter L color at t = 0 | Time to a 92° C. viscosity of 400 BU (min) | Hunter L color at a 92° C. viscosity of 400 BU |
|---|---|---|---|---|
| 0 | 2.22 | 90.67 | 90 | 85.4 |
| 345 | 9.77 | 91.17 | 75.5 | 85.8 |
| 517 | 13.55 | 91.84 | 69.9 | 86.4 |

Example 3

Effect of Starch Weight and Air Purge Rates

Three batches of the same anhydrous pH adjusted waxy corn starch used in Example 1 were thermally inhibited at 171° C. in a ProcessAll pilot scale mechanically fluidized mixer. Starch weight and air purge rates (airflow) were varied and the thermal inhibition rates tracked using the buffered acidic Brabender procedure. Oxygen percentages were maintained below the limiting oxygen content necessary for combustion with a supplemental nitrogen purge protecting the vessel. The vessel pressure was ambient. Results are presented in Table 2, below:

TABLE 2

| Experiment | Starch Weight (kg) | Airflow (scmh) | Airflow to Starch Weight (scmh/kg) | Headspace turnover rate (1/hr) | Cook Time (min) | Brabender Viscosity at 92° C. (BU) | Brabender Viscosity at 92° C. + 15 min (BU) |
|---|---|---|---|---|---|---|---|
| A | 45.5 | 1.32 | 0.029 | 7.2 | 60 | 415 | 495 |
| B | 45.5 | 0.66 | 0.015 | 3.6 | 90 | 415 | 455 |
| C | 22.7 | 0.66 | 0.029 | 3.6 | 60 | 420 | 475 |

The values obtained for the viscosity measurements at 92° C. and 92° C. + 15 minutes across each set can be considered to be within the experimental error of +/−20 BU
scmh = standard cubic meters per hour, with the standard being 0° C. and 101.3 kPa.

Experiments A and C have the same airflow to starch weight ratio. However, C has a lower headspace turnover rate than A. The two experiments demonstrate the same reaction kinetics—as measured by the 92° C. Brabender viscosity for samples from the same cook time. Thus, thermal inhibition is dependent on the airflow to starch weight (ratio) and not the vessel headspace turnover rate.

Furthermore, Experiment B shows slower thermal inhibition kinetics at a lower airflow to starch weight ratio. This is evident with the 415 BU 92° C. viscosity occurring at 90 minutes as opposed to 60 minutes.

An additional batch of the same anhydrous pH adjusted waxy corn starch was thermally inhibited at 168° C. in a pilot scale mechanically fluidized reactor. In this experiment, the vessel pressure was raised to 193 kPag. The same ratio of oxygen to nitrogen used in experiments A, B, and C was maintained in this experiment to protect the vessel. Results are presented in Table 3, below.

TABLE 3

| Experiment | Starch Weight (kg) | Air Flow (scmh) | Air Flow to Starch Weight (scmh/kg) | Cook time (min) | Brabender viscosity at 92° C. (BU) | Brabender viscosity at 92° C. + 15 min (BU) |
|---|---|---|---|---|---|---|
| D | 45.5 | 0.00 | 0.00 | 60 | 415 | 465 |

Experiment D has the same kinetics as experiments A and C as measured by the 92° C. Brabender viscosity. However, there is no gas purge in Experiment D. Thus, as the vessel pressure is increased the airflow to starch ratio importance decreases, removing the thermal inhibition requirement for a gas purge at elevated pressures.

Example 4

Effect of Dew Point Temperature

Waxy corn starch with a 9.6 pH is dehydrated in a fluid bed reactor. The dehydrated material is split into two aliquots. The first sample is thermally inhibited in a fluidized bed reactor at 160° C. for 120 minutes with a fluidization gas dew point of −15° C. The second sample is thermally inhibited in the same fluidized bed reactor at 160° C. for 120 minutes with a fluidization gas dew point of −18° C. In both cases, the reference pressure is 101.325 kPa.

FIG. 5 illustrates the fluidization gas moisture content impact. Although both powders had 0.0% moisture as measured by the moisture procedure, material processed in the higher dew point fluidization gas exhibited hydrolysis. Potential hydrolysis was indicated by the lower 92° C.+15 minute viscosity compared to the 92° C. viscosity and was confirmed be examining the texture of the cook (cooked starch).

Example 5

Effect of Pressurized Air

Tapioca starch is pH adjusted to 8.5 by adding sodium carbonate to a tapioca starch slurry. The starch is dewatered in a Buchner funnel and the cake broken apart to air dry overnight on a tray. The starch is then ground in a coffee grinder and split into two aliquots.

The first starch portion is put into a fluid bed reactor fluidized with air dried to less than −10° C. dew point. The reactor is brought to 120° C. and held at that temperature until the starch is dehydrated to less than 1% moisture. Once the starch is below 1% moisture, the starch is heated to 166° C. Material is sampled throughout the experiment for Brabender and color analysis.

The second starch portion is put into the same fluid bed reactor and dehydrated in the same manner as the first portion. Then the starch is brought to 166° C. With the starch at 166° C., the reactor is pressurized to 586 kPag bringing the oxygen concentration to 39.5 moles/m$^3$ as fluidization continues with dried air. Samples are taken through the heat treatment for Brabender and color analysis.

Material from the second experiment has a lower 92° C. Brabender viscosity than samples taken at the same time in the process as in the first experiment, indicating increased thermal inhibition kinetics for the pressurized reaction. In addition, samples from the second experiment have higher Hunter L color values than comparable 92° C. Brabender viscosity samples taken in the first experiment.

Example 6

Effect of Gas Pressure

A commercial vacuum dryer similar to the Bepex Continuator® dehydrates rice starch (pH adjusted to 9.0) to less than 1% moisture using a combination of vacuum, gas purge, and temperature profile such that the starch is not degraded or hydrolyzed. The dehydrated starch is split into two lots.

The first lot is fed into a Littleford reactor. A combination of air and nitrogen purge the Littleford, dropping the fraction of oxygen in the headspace to a non-combustible level. Vessel pressure and temperature is increased to 200 kPag and 150° C. such that the oxygen concentration is 6.7 moles/m$^3$. With the vessel at processing temperature and pressure, the gas purge is stopped. Samples are taken throughout the heat-treatment for subsequent analysis.

The second lot is fed into the same Littleford reactor. The air and nitrogen purge inert the vessel to the same oxygen fraction as in the first experiment. Vessel temperature is increased to 150° C. and pressure is held at 0 kPag. At processing temperature, the gas purge is stopped. Samples are pulled throughout the heat-treatment for subsequent analysis.

Material from the first experiment shows thermal inhibition as measured by Brabender viscosity. Material from the second experiment exhibit degraded and hydrolyzed characteristics. For example, samples from the second experiment do not have a continuously rising curve viscosity profile, were darker in color and were characterized by sub-optimal texture qualities such as undesirable cohesiveness and long texture. In addition the second example also exhibited more solubility, indicative of hydrolysis. In the second case, the purge rate was not above the minimum required for a non-pressurized heat-treatment.

Example 7

Effect of Oxygen Concentration

Low protein waxy corn flour at pH 9.5 and 10% moisture is dehydrated to less than 1% moisture using a Solidaire® thin film dryer without degradation or hydrolysis.

A 500 g sample is put into a 1-liter Parr laboratory reactor and sealed. The vessel is purged with 0.015 scmh of air, stirred with a magnetically coupled paddle, and heated to 160° C. Throughout heat-treatment, the vessel is stirred, purged, and maintained at a pressure of 0 kPag and a 5.88 moles/m$^3$ oxygen concentration. After one hour at 160° C., the vessel is cooled and the low protein waxy corn flour analyzed for color and Brabender viscosity profile.

A second 500 g anhydrous sample from the Solidaire® is put into a 1-liter Parr laboratory reactor and sealed. The vessel is purged with 0.015 scmh of a 50:50 mixture of oxygen and nitrogen (14 moles/m$^3$ oxygen concentration). The vessel is heated to 160° C. and held at temperature for one-hour. Throughout the heat-treatment, the vessel is agitated, purged with the gas mixture, and maintained a pressure of 0 kPag. After the vessel is cooled, the low protein waxy corn flour is analyzed for color and Brabender viscosity profile.

The 92° C. Brabender viscosity for the second experiment is lower than that of the first experiment. In addition, the color relative to the inhibition degree in the second experiment is lighter than the first.

We claim:

1. A composition produced by the process which comprises the steps of:
   a) dehydrating a polysaccharide to substantially anhydrous or anhydrous conditions, and
   b) thermally inhibiting the substantially anhydrous or anhydrous polysaccharide in a gas with an effective oxygen concentration of at least 9.77 moles/m$^3$ at a temperature of 100° C. or greater for a time sufficient to inhibit the polysaccharide,
   wherein the effective oxygen concentration is achieved by increasing the pressure of the gas to above ambient during the thermal inhibition step, or by increasing the percent oxygen content of the gas.

2. The composition of claim 1, wherein the composition has a Hunter L color at least 0.5 units higher than a composition produced using the same process with an effective oxygen concentration of about 6.5 moles/m$^3$.

3. The composition of claim 1, wherein the composition has a Hunter L color no more than 7 units less than the polysaccharide before thermal inhibition.

4. The composition of claim 1 wherein the effective oxygen concentration is achieved by increasing the pressure of the gas to above ambient during the thermal inhibition step and the oxygen concentration is below the limiting oxygen concentration.

* * * * *